United States Patent [19]

Canela et al.

[11] 4,186,119

[45] Jan. 29, 1980

[54] POLYURETHANES PREPARED FROM ALCOHOLS AND HYDROCARBON POLYISOCYANATES USED IN TEXTILE WET TREATMENT PROCESSES

[75] Inventors: José Canela, Therwill; Hans Gerber, Allschwil, both of Switzerland

[73] Assignee: Sandoz Ltd., Basel, Switzerland

[21] Appl. No.: 964,163

[22] Filed: Nov. 28, 1978

Related U.S. Application Data

[63] Continuation of Ser. No. 852,131, Nov. 16, 1977, abandoned.

[51] Int. Cl.$^2$ ............................................. C08G 18/50
[52] U.S. Cl. ................... 260/29.2 TN; 8/95; 8/162 R; 427/158; 427/390 C; 428/425; 528/76; 528/77

[58] Field of Search ................... 528/76, 77; 8/162 R, 8/95; 427/158, 390; 428/425; 260/29.2 TM

[56] References Cited

U.S. PATENT DOCUMENTS

| | | | |
|---|---|---|---|
| 2,956,031 | 10/1960 | Khawam | 528/76 |
| 3,105,063 | 9/1963 | Damusis | 528/76 |
| 3,489,698 | 1/1970 | Morehouse | 528/77 |
| 3,695,924 | 10/1972 | Wagner | 427/390 C |
| 3,705,823 | 12/1972 | Hosokawa et al. | 427/390 C |
| 4,024,307 | 5/1977 | Brahm et al. | 428/425 |

*Primary Examiner*—Maurice J. Welsh
*Attorney, Agent, or Firm*—Gerald D. Sharkin; Richard E. Vila; Thomas C. Doyle

[57] ABSTRACT

Disclosed is a textile wet treatment process wherein, to increase the lubricity of the substrate, certain specified polyurethanes are employed in the treatment liquor.

22 Claims, No Drawings

POLYURETHANES PREPARED FROM ALCOHOLS AND HYDROCARBON POLYISOCYANATES USED IN TEXTILE WET TREATMENT PROCESSES

This is a continuation of application Ser. No. 852,131, filed Nov. 16, 1977 and now abandoned.

In the wet processing of synthetic or semi-synthetic textile materials by modern processing methods, especially in winch-beck and jet dyeing machines, the undesirable formation of creases in the material represents a problem. Such crease formation, for example, can lead to unlevel dyeing.

It has now been discovered that the tendency of the material to creasing can be considerably reduced or even eliminated if the wet processing is effected in the presence of certain water-soluble or -dispersible polyurethanes having the property of increasing the fibre/fibre lubricity and which can be named lubricating agents.

The present invention relates to such lubricating agents and their use in the wet processing of textile materials, and, more particularly, provides a wet treatment process for synthetic or semi-synthetic textile material comprising employing a liquor containing a polyurethane, which polyurethane is a reaction product of a compound or mixture of compounds 1, the or each compound 1 being a derivative of ammonia; a polyamine; urea; a polyamide; an aminoamide; an aminoalcohol; or a polyol containing up to 10 carbon atoms and up to 6 hydroxyl groups per molecule; in which at least three of the active hydrogen atoms of the amino, hydroxyl and/or amido moieties present are replaced by the same or different groups of formula 1a,

   1a in which
  each Alkylene, independently, is straight or branched chain $(C_{2-4})$-alkylene, unsubstituted or substituted by a phenyl group, and
  n is an integer 1 to 100,
and a compound or mixture of compounds 2, the or each compound 2 being a hydrocarbon polyisocyanate, in a molar ratio of compound(s) 1:compound(s) 2 of $\Sigma p:\Sigma r$, p being the moles of the or each compound 1 and r being the moles of the or each compound 2 reacted, $\Sigma p$ and $\Sigma r$ being so chosen that $\Sigma(p.q) \div \Sigma(r.m) = 1.5$ to 21 and $\Sigma p \leq \Sigma(r.m)$, q being the number of groups of formula 1a per molecule of the or each compound 1 and m being the number of isocyanate groups per molecule of the or each compound 2, and which polyurethane is water-soluble or dispersible to a degree at least 1 g/l at 20° C., and whose 1 g/l aqueous solution or dispersion at 20° C. exhibits a viscosity of no more than 100 cp.

Thus the relative amounts of the reacting species used to produce the polyurethane employed in the process of the present invention is such that the total number of molecules of the compound(s) 1 does not exceed the total number of NCO groups in the compound(s) 2, and that the polyurethane reaction product has a ratio of free hydroxyl groups present in groups of formula Ia: urethane groups of from 0.5:1 to 20:1, it preferably being from 0.5:1 to 10:1, preferably in the upper region of said latter range when the product is of relatively high molecular weight.

By the expression "water-dispersibility of at least 1 g/l at 20° C." used above is meant that displayed when an aqueous dispersion of the polyurethane product containing at least 1 g/l of the product remains stable, i.e. does not show any visible signs of deposition of the dispersed product, after standing at 20° C. for at least 12 hours.

Preferably the polyurethane product is water-soluble rather than merely water-dispersible, and has a water-solubility of at least 10 g/l, more preferably at least 25 g/l, at 20° C.

The solidification temperature of the polyurethanes used in the process of the present invention preferably does not exceed 150° C.

The polyurethane products may still contain a certain amount of untreated free isocyanate groups, but for the purposes of the present invention, up to 1% of the unreacted isocyanate groups originally present in the starting compound(s) 2 in the product can be tolerated.

In the compounds 1, there are preferably present at least as many alkyleneoxy units as the number of active amino, hydroxy and/or amino hydrogen atoms in the original ammonia, polyamine, urea, polyamide, aminoamide, amino-alcohol or polyol.

When the compound 1 is a polyoxylated polyamine, this compound preferably contains 2 to 6 nitrogen atoms per molecule, and more preferably is selected from the polyoxyalkylated aliphatic polyamines of formulae 11, 12 and 13,

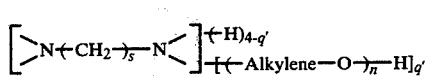   11

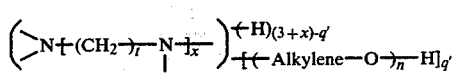   12

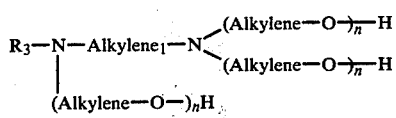   13 and from polyoxyalkylated melamine of formula 14,

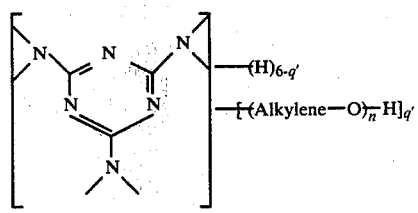   14 in which
  s is an integer 2 to 6,
  each t, independently, is an integer 2 or 3,
  x is an integer 2, 3 or 4,
  $R_3$ is $(C_{1-30})$alkyl or $(C_{3-20})$alkenyl,
  Alkylene₁ is $-(CH_2)_2-$, $-(CH_2)_3-$ or $-(CH_2)_4-$,
  q' is an integer at least 3, its maximum values being 4, (3+x) and 6 for the compounds of formula 11, 12 and 14, respectively, and
  each Alkylene, independently, and n, independently, are as defined above.

In the formula 11, s is preferably 2 or 3.

Alkylene₁ in the formula 13 is preferably $-(CH_2)_2-$ or $-(CH_2)_3-$. $R_3$ in this formula, independently of any preferred meaning for Alkylene₁, is preferably an alkyl or alkenyl group containing at least 8 carbon atoms, more preferably a $(C_{8-24})$alkyl or $(C_{8-20})$alkenyl group. Most preferably, $R_3$ is lauryl, myristyl, palmityl, stearyl, arachidyl, behenyl or oleyl.

The preferred polyoxyalkylated polyamines are those of formulae 11, 12 and 13.

When the compound 1 is a polyoxyalkylated polyamide, the polyamide from which it is derived preferably has an average molecular weight in the range 500–30,000, i.e. is a higher molecular weight polyamide. Such polyamides can be aliphatic, aromatic or araliphatic, any aliphatic unit preferably containing 1 to 36, more preferably 4 to 12, carbon atoms, any aromatic unit preferably being $C_{6-10}$ and being derived from benzene or naphthalene, and any araliphatic unit preferably containing 7 to 25 carbon atoms, the aromatic units therein preferably being derived from benzene and/or naphthalene. Preferably the polyoxyalkylated polyamide is derived from a conventionally employed alcohol-soluble nylon with a solidification temperature between 50° and 160° C., more preferably from those which are themselves derived from dimerised $(C_{10-20})$ unsaturated fatty acids and di- or triamines. Preferably the di- or triamines employed in the production of such polyamides are selected from the compounds of formulae 11a, 12a and 13a

in which s, each t independently, x, $R_3$ and $Alkylene_1$ are as defined above.

In general, the polyoxyalkylated polyamides from which the polyurethanes used in the process of the present invention are produced preferably conform to the formula 15,

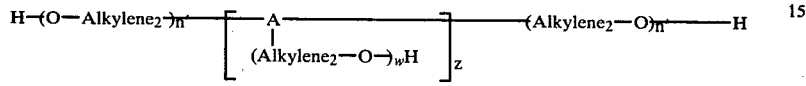

in which
A is a repeating unit of an aliphatic, aromatic or araliphatic polyamide, the bond to $-(Alkylene_2-O)_w H$ being from the nitrogen atom of a —CON— or —CONH moiety contained in the repeating unit,
each $Alkylene_2$, independently, is a divalent group of formula,

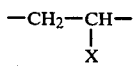

wherein X is hydrogen, methyl, ethyl or phenyl,
each n', independently, is an integer 3 to 30,
each w, independently, is 0 or an integer 3 to 30,
and z is an integer 5 to 1000,
each repeating unit A being the same or different.

Of the compounds of formula 15, those in which any $Alkylene_2$ moiety is ethylene-1,2 or propylene-1,2 are preferred.

When the compound 1 is a polyoxyalkylated aminoamide, this is preferably a polyoxyalkylated amidation product of an aliphatic monocarboxylic acid or of a functional derivative thereof, e.g. its acid chloride, acid bromide, anhydride or an ester, and one or more polyamines of formulae 11a and 12a, as defined above. Such polyoxyalkylated amidation products are preferably those of formulae 16 and 17,

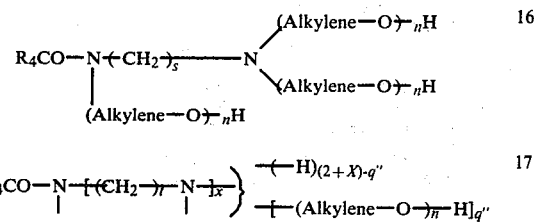

in which
$R_4$ is $(C_{1-23})$alkyl or $(C_{2-19})$ alkenyl,
s, each t, independently, x, and each Alkylene and each n, independently, are as defined above, and
q" is an integer at least 3, its maximum value being (2+x).

In both formulae 16 and 17, $R_4CO$ is preferably $(C_{8-24})$alkanoyl, more preferably $(C_{12-22})$alkanoyl, or $(C_{8-20})$ alkenoyl. Most preferably $R_4CO$ is derived from lauric, myristic, palmitic, stearic, arachic, behenic, oleic, linoleic or linolenic acid. s in the formula 16 is preferably 2 or 3.

When the compound 1 is a polyoxyalkylated aminoalcohol, this is preferably a polyoxyalkylated derivative of an alkanolamine containing a single amino group and 1 to 3 hydroxyl groups per molecule, more preferably one containing 4 to 6 carbon atoms per molecule. Particularly preferred examples of these are the polyoxyalkylated derivatives of 2-amino-2-hydroxymethyl-1,3-propane diol, 2-amino-2-methyl-1,3-propane diol, 2-amino-2-ethyl-1,3-propane diol and 2-amino-2-hydroxymethyl-propane.

When the compound 1 is a polyoxyalkylated polyol, this is preferably a polyoxyalkylated derivative of an aliphatic polyol containing 3 to 10 carbon atoms and 3 to 6 hydroxyl groups per molecule. Particularly preferred examples of these are the polyoxyalkylated derivatives of glycerol, 1,1,1-trimethylolpropane, 1,2,4-trihydroxybutane, pentaerythritol, sorbitol, mannitol and tetramethylolcyclohexanol.

In general the compound 1 preferably contains no aromatic or unsaturated aliphatic radicals emanating from the precursor before polyoxyalkylation. It is preferably a polyoxyalkylated derivative of ammonia, of a polyamide, or of any of the remaining active hydrogen atom-containing precursors in which 3 to 7, more preferably 3 to 5, or most preferably 3, of the active hydrogen atoms are replaced by one or more groups of formula Ia, as defined above. More preferably the compound 1 is a polyoxyalkylated derivative of ammonia; a polyamide; or a polyamine, aminoamide, aminoalcohol or polyol in which 3 to 7, more preferably 3 to 5, or most preferably 3, of the active hydrogen atoms are replaced by one or more groups of formula Ia. Most preferably the compound 1 is a polyoxyalkylated derivative of ammonia.

Alkylene in the formula 1a is preferably Alkylene$_2$, i.e. a divalent group of formula

    5 in which X is hydrogen, methyl, ethyl or phenyl, or more preferably ethylene-1,2 or propylene-1,2, i.e. of the above formula, in which X is hydrogen or methyl.

In all the compounds 1 except the polyoxyalkylated derivatives of ammonia and of a polyamide, preferably 3 to 7, more preferably 3 to 5, or most preferably 3 of the active hydrogens of the active hydrogen atom-containing precursors of the polyoxyalkylated derivatives are replaced by one or more groups of formula 1a, as defined above.

n is preferably an integer 3 to 50, or more preferably 3 to 30, except in the case where the compound 1 is a polyalkoxylated derivative of ammonia, in which case n is preferably 3 to 100. When the active hydrogen-containing precursor of the compound 1 contains two or more nitrogen atoms, n is even more preferably 3 to 20.

Preferably the compound 1 is such that a 5% aqueous solution thereof has a pH of 4 to 12, more preferably 6 to 8.

A preferred group of compounds 1 for use in the process of the present invention is thus constituted by the compounds of formula 1',

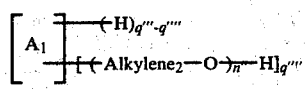    1' in which
A$_1$ is
  nitrogen,
  a radical 11b,

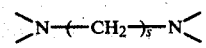    11b a radical 12b,

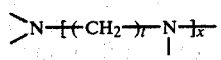    12b a radical 13b,

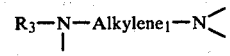    13b a radical of an aliphatic, aromatic or araliphatic polyamide containing 5 to 1000 repeating units, said radical being derived from the polyamide by removal of the hydrogen atoms from the —CONH$_2$ and —CONH— groups,
a radical 16b,

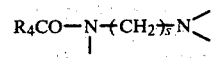    16b a radical 17b,

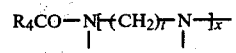    17b a radical of an alkanolamine containing a single amino group, 1 to 3 hydroxyl groups and 4 to 6 carbon atoms per molecule, said radical being derived from the alkanolamine by removal of the hydrogen atoms from the amino and from the hydroxyl group(s), or
  a radical of an aliphatic polyol containing 3 to 10 carbon atoms and 3 to 6 hydroxyl groups per molecule, said radical being derived from the polyol by removal of the hydrogen atoms from the hydroxyl groups,
s, each t, independently, x, R$_3$, Alkylene$_1$, R$_4$ and each Alkylene$_2$, independently, are as defined above,
each n'', independently, is, when A$_1$ is nitrogen, an integer 3 to 100, or, when A$_1$ is any other of the indicated radicals, an integer 3 to 30,
q''' is the maximum valency for each radical signified by A$_1$, being 3 when A$_1$ is nitrogen, 4 when A$_1$ is a radical 11b, (3+x) when A$_1$ is a radical 12b, 3 when A$_1$ is a radical 13b, 7 to 1002 when A$_1$ is a radical of a polyamide containing 5 to 1000 repeating units, respectively, 3, 4 or 5 when A$_1$ is a radical of an alkanolamine containing 1,2 or 3 hydroxyl groups per molecule, respectively, or 3, 4, 5 or 6 when A$_1$ is a radical of an aliphatic polyol containing 3, 4, 5 or 6 hydroxyl groups, respectively, and
q'''' is an integer 3 to q''', with the proviso that when A$_1$ is a polyamide radical, the polymeric chain of the polyoxyalkylated polyamide is terminated at both ends by a group —[—(Alkylene$_2$-O—)$_n$-H]$_{q'''}$, and each repeating unit is the same or different.

In the compounds of formula 1', each Alkylene$_2$, independently, is preferably ethylene-1,2 or propylene-1,2. n'', when A$_1$ contains 2 or more nitrogen atoms, is preferably 3 to 20. Except when A$_1$ is a polyamide radical, q'''' is preferably 3 to 5 when the values 4 or 5 are possible.

Amongst the preferred group of compounds of formula 1' are the compounds of formula 15, as defined above, which correspond with the compounds of formula 1', in which A$_1$ is a radical of a polyamide containing 5 to 1000 repeating units.

Of the compounds of formula 1', those in which A$_1$ is nitrogen or a radical of a polyamide, of an alkanolamine or of an aliphatic polyol are preferred, especially those in which A$_1$ is nitrogen.

Preferably at least 36 mol %, more preferably at least 50 mol %, or most preferably all, of the Alkylene or Alkylene$_2$ moieties in the compounds 1 and of formulae 15 and 1' are ethylene groups.

Any hydrocarbon polyisocyanate can be used as the compound(s) 2 for production of the polyurethanes used in the process of the present invention, especially those hydrocarbon polyisocyanates conventionally used as starting materials in the production of polyurethanes. The hydrocarbon moiety can be aliphatic, aromatic or araliphatic, any aliphatic group being straight or branched chain, saturated or unsaturated. For the purposes of this specification, the term "aliphatic", when applied to aliphatic or araliphatic polyisocyanates, includes "alicyclic" as well as "acyclic". The hydrocarbon polyisocyanate preferably has 2 to 12 isocyanato substituents, more preferably 2 to 6, even more preferably 2 to 4 or most preferably 2, per molecule.

Preferably the compounds 2 are polyisocyanates produced from reaction of the corresponding polyamines with phosgene or of acid anhydrides or olefins with isocyanic acid, from Curtius rearrangement of the corresponding acylazides or from reaction of nitro compounds with carbon monoxide in known manner.

More preferably the hydrocarbon polyisocyanates 2 are selected from those of formulae 21, 22, 23 and 24:

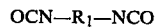     21

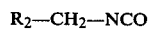     22

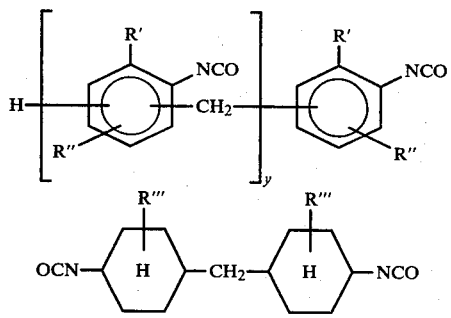

in which
R$_1$ is straight or branched chain (C$_{2-40}$)alkylene; cyclohexylene, saturated or unsaturated with one or two double bonds and unsubstituted or substituted with 1 to 3 (C$_{1-2}$)alkyl groups; or phenylene, diphenylene or naphthylene, each unsubstituted or substituted with 1 or 2 (C$_{1-9}$)alkyl groups, the —NCO groups on diphenylene being on different benzene nuclei, R$_2$ is a radical of formula,

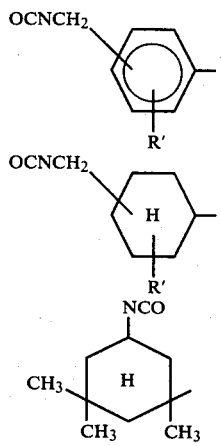

each R', independently, is hydrogen or (C$_{1-9}$)alkyl,
each R", independently, is hydrogen or —NCO,
each R''', independently, is hydrogen or methyl, and
y is an integer 1 to 5, there being no more than 6 —NCO groups per molecule, and any two —NCO groups on the same benzene ring being m- or p- to each other, in the compounds of formula 23.

When R$_1$ in formula 21 is alkylene, this is preferably (C$_{2-34}$), or more preferably (C$_{2-6}$)alkylene. When it is (C$_{1-2}$)alkyl-substituted cyclohexylene, the or each alkyl substituent is preferably methyl.

Any (C$_{1-9}$)alkyl substituent on phenylene, diphenylene or naphthylene, when R$_1$ signifies alkyl-substituted phenylene, diphenylene or naphthylene, respectively, is preferably (C$_{1-3}$)alkyl, more preferably (C$_{1-2}$)alkyl, or most preferably methyl. Similarly, the (C$_{1-9}$)alkyl radical signified by any R' is preferably (C$_{1-3}$)alkyl, more preferably (C$_{1-2}$)alkyl, or most preferably methyl.

y in formula 23 is preferably 1 to 3, or more preferably 1 or 2.

Especially preferred compounds 2 are 1,2-dimethylene-diisocyanate, 1,6-hexamethylenediisocyanate and further α,ω-polyalkylenediisocyanates containing up to 34 carbon atoms in the polyalkylene chain, isophoron diisocyanate, xylidene diisocyanate, 1,3-bis-(isocyanatomethyl)cyclohexane, cyclohexylene diisocyanate, 2,4- and 2,6-tolylene diisocyanate, m-phenylene diisocyanate, xylene diisocyanate, 1,5-naphthylene diisocyanate, 4,4'-diphenylmethane diisocyanate, 3,3'-dimethyl-4,4'-diphenylene diisocyanate, 3,3'-dimethyl-4,4'-diisocyanatodiphenylmethane and polymethylene polyphenylene isocyanates (compounds of formula 23), e.g. such isocyanates produced as reaction products from phosgene with aniline-formaldehyde condensates.

The most preferred compounds 2 are selected from hexamethylenediisocyanate, 2,4- and 2,6-tolylene diisocyanates and polymethylene polyphenylene isocyanates containing 2 to 4 isocyanate groups per molecule, of which the aliphatic isocyanates are preferred to the aromatic ones.

The reaction between the compound(s) 1 and the compound(s) 2 can be effected under acid, neutral or basic conditions, preferably under slightly acid conditions. Depending on the pH value of the reaction mixture, it may or may not be necessary or desirable to acidify or basify the mixture by conventional manner to create favourable pH conditions for reaction. Furthermore, the reaction can be effected under anhydrous or practically anhydrous conditions, suitably by mere admixture of the reagents in the above mentioned molar ratio and heating, preferably between 70° and 150° C., more preferably between 80° and 130° C.

Alternatively the reaction can be effected in the presence of an organic solvent. Suitable organic solvents are polar solvents which contain no reactive hydrogen atoms capable of participating in the reaction with either of the reagents, and are preferably selected from acetone, dimethyl formamide and dioxan.

Preferably the reaction is carried out in the absence of a solvent.

The relative molar quantities of the reagents are preferably such as to result in a product having a ratio of free hydroxyl groups to urethane groups of from 0.5:1 to 10:1. Where the product is to be of relatively high molecular weight, this ratio is preferably in the upper region of the given range.

As is conventional in polyurethanes production, the isocyanate(s) 2 can be used in the reaction in partially or fully blocked form instead of in the form in which the isocyanate groups are free. When used in blocked form, the unblocked form is generated in situ under the reaction conditions, such that the free isocyanate groups become available for reaction with the hydroxyl groups of the compound(s) 1. By the expression "blocked form" is meant in a form in which some or all of the isocyanate groups have been converted to polyurethane groups, these being labile under the reaction conditions used for reacting the compound(s) 1 with the compound(s) 2.

Preferably the blocked isocyanates 2 have been blocked, partially or fully, with a phenol, preferably toluol or unsubstituted phenol and/or with a readily removable aliphatic alcohol, e.g. 1,1,1-tris(hydroxymethyl)ethane or -propane, and preferably the blocking is such that no free hydroxyl groups emanating from the blocking agent are present in the blocked isocyanate.

As is also conventional, when a compound 2 is used in partially or fully blocked form in the reaction between the compound(s) 1 and compound(s) 2, the reaction must be conducted at or above the temperature at which the unblocked form of the compound(s) 2 is generated from the blocked form, more preferably at somewhat higher temperatures. Preferably the reaction is conducted within the temperature range 100°–150° C., more preferably 110°–130° C.

In all cases the reagents are generally first contacted with each other at a relatively low temperature e.g. at about 60° C., and then the mixture is heated to the suitable reaction temperature and maintained at this temperature until the desired degree of reaction has occurred, i.e. until the reaction product is practically free of isocyanate groups. Generally the reaction is sufficient when there remains 1% less of the isocyanate groups originally present in the starting compound(s) 2. The course of the reaction can be followed by periodically testing samples of the reaction mixture in known manner, e.g. to determine the extent to which unreacted isocyanate groups are present in the reaction mixture or from viscosity measurements. Completion of reaction is signified when no more, or practically no more, free isocyanate groups of the compound(s) 2 are available for reaction with the hydroxyl groups of the compound(s) 1. Completion of the reaction may also often be recognized by the commencement of gelatinization of the reaction mixture.

The present invention further provides new compounds within the scope of the polyurethanes used in the process of the present invention, which are polyurethane products of the reaction between a compound or a mixture of compounds of formula 1', as defined above, and a compound or mixture of compounds 2, as also defined above, in a molar ratio of compound(s) of formula 1':compound(s) 2 of $\Sigma p':\Sigma r'$, p' being the moles of the or each compound of formula 1' and r' being the moles of the or each compound 2 reacted, and $\Sigma p'$ and $\Sigma r'$ being so chosen that $\Sigma(p'.q'''') \div \Sigma(r'.m) = 1.5$ to 21 and $\Sigma p' \leq \Sigma(r'.m)$, $q''''$ being the number of groups of formula 1'a,

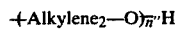

per molecule of the or each compound of formula 1' and m being the number of isocyanate groups per molecule of the or each compound 2, and which polyurethane products are water-soluble or -dispersible to a degree of at least 1 g/l at 20° C., and whose 1 g/l aqueous solution or dispersion at 20° C. exhibits a viscosity of no more than 100 cp.

Thus the relative amounts of the reacting species used to produce the polyurethanes of the present invention is such that the total number of molecules of the compound(s) of formula 1' does not exceed the total number of —NCO groups in the compound(s) 2, and that the polyurethane reaction products have a ratio of free hydroxyl groups:urethane groups of from 0.5:1 to 20:1.

The afore-mentioned preferences for the polyurethanes used in the process of the present invention and for the starting materials used in their production, i.e. the compounds 1 and 2, apply also to the polyurethanes of the present invention and to the starting materials used in their production, i.e. the compounds of formula 1' and the compounds 2, respectively. The polyurethanes of the present invention are producible under the reaction conditions indicated above for producing the polyurethanes in general used in the process of the present invention.

The compounds 1, e.g. of formula 1', are either known or can be produced by conventional methods, preferably by oxyalkylation of the preoxyalkylation precursors of the compounds 1. In the case of the compounds 1 which are polyoxyalkylated derivatives of ammonia, such compounds are preferably produced by oxyalkylation of appropriate mono-, di- or tri-alkanolamines with the appropriate alkylene oxide(s) or halohydrin(s), or with appropriate polyalkyleneoxy compounds, preferably with an average molecular weight of 100 to 6000, in conventional manner.

The compounds 2 are either known, or can be produced by methods analogous to the known methods, e.g. as indicated hereinbefore.

The process of the present invention can be effected simultaneously with any wet treatment process for synthetic or semi-synthetic textile materials, e.g. dyeing, optical brightening, bleaching, washing, boiling and fixation, i.e. generally any wet treatment process in which the treated textile material tends to crease during treatment in an aqueous bath. Preferably the process is effected simultaneously with a dyeing process, especially in a winch-beck or jet dyeing machine. Here the difference between a textile material dyed in the absence of the lubricating agent and one dyed in its presence is often clearly visible, signs of the creasing, e.g. a streaky appearance, in the first case being largely or totally absent in the second case.

Preferred synthetic or semi-synthetic textile materials treated by the process of the present invention are of cellulose 2½acetate, cellulose triacetate, polyamide, polyester and/or polyacrylonitrile, of which polyamide materials are most preferably treated.

When the wet treatment process is a dyeing process, any dyestuff(s) may be used together with the polyurethane lubricating agent in the treatment liquor, its/their nature depending, inter alia, on the dyeing method employed and on the substrate to be dyed. Examples of the dyestuffs employable are anionic, metal complex, disperse and basic dyestuffs, e.g. those listed in the Color Index under "Acid Dyes", "Mordant Dyes", "Disperse Dyes" and "Basic Dyes". The process of the present invention is preferably, however, effected in dyeing processes with anionic or disperse dyestuffs, more preferably with disperse dyestuffs, in which the polyurethane lubricating agents display especially good effects.

The polyurethane lubricating agents are preferably present in the wet treatment liquor employed at temperatures between 50° and 150° C., and, independently, at a concentration between 0.1 and 5 g, more preferably 0.3 to 1 g, of polyurethane reaction product (active substance) per liter of treatment liquor.

After the wet treatment process, the polyurethane lubricating agent(s) used are washed out of the treated textile material in the usual washing and/or rinsing operations.

The polyurethane lubricating agents used in the process of the present invention do not significantly adversely affect the action of the dyestuff or other treatment agent used simultaneously or the treated textile material. For example, the light, wet and rubbing fastnesses of dyeings and the migratory properties of the dyestuffs in or on the substrates are not significantly adversely affected.

The polyurethane lubricating agents are preferably added to the treatment liquor before the wet treatment process is begun in the form of an aqueous concentrate. Such concentrates preferably contain at least 25% by weight of polyurethane reaction product (active substance), or more preferably at least 50% by weight. The viscosity of such aqueous concentrates preferably does not exceed 100,000 cp at 20° C.

Alternatively, the concentrate may be diluted with water before addition to the treatment liquor.

The present invention further provides aqueous concentrates of the compounds of the present invention, as defined hereinbefore, preferably at a concentration at least 25%, or more preferably at a concentration at least 50% by weight.

The invention is illustrated by the following Examples, in which temperatures are given in degrees Centigrade. Examples 1 to 25 illustrate the production of the polyurethane lubricating agents for use in the process of the present invention, and the "Application Examples" illustrate the process.

EXAMPLE 1

200 g of a polyamide with an acid number of 5.6 and a base number of 5.41 (expressed as mg KOH.g$^{-1}$) are melted at 130° in a current of nitrogen, and then 2 g of powdered sodium hydroxide are added. The nitrogen current is stopped and ethylene oxide is introduced with vigorous stirring at a speed at which full reaction ensues. After 10 hours, 475 g of ethylene oxide are added to the polyamide, and after the reactor has been rinsed with nitrogen, the slightly brown reaction product (I) is cooled and discharged. Titration of (I) gives an equivalent weight of 410 g per hydroxyl group.

3.5 g of hexamethylene diisocyanate are added dropwise over the course of 30 minutes at 45° with stirring to 50 g of (I) which has been slightly acidified with 100% sulphuric acid (pH value 6.5 with a 5% aqueous solution) and the mixture is reacted for 30 minutes. The reaction mixture is then heated to 100° and stirred for 2 more hours. As the viscosity of the oligomer begins to increase, 214 g of cold water are added, and the mixture is stirred until a solution (II) is produced. At 20°, (II) has a viscosity of 2,500 cp.

EXAMPLE 2

100 g of (I) are neutralised (pH 7.0 with a 5% aqueous solution) with sulphuric acid by the same process as described in Example 1 and are treated with 5 g of tolylene diisocyanate (80% 2,4- and 20% 2,6-isomer) for one hour at 115°. After dissolving the reaction mixture in 307 g of distilled water, a solution (III) is obtained, which has a viscosity of 750 cp.

EXAMPLE 3

100 g of (I) are reacted by the same process as described in Example 2 with a mixture of 3 g of hexamethylene diisocyanate and 4 g of tolylene diisocyanate for 10 hours. A 25% aqueous solution (IV) of the end-product has a viscosity of 850 cp.

EXAMPLE 4

100 g of (I) are reacted by the same process as described in Example 1 with 3.5 g of a polymethylene polyphenylene isocyanate (139 g/equivalent, functionality related to NCO groups about 3) for 30 minutes. A 25% solution (V) of the product has a viscosity of 150 cp.

EXAMPLE 5

100 g of (I) are reacted by the same process as described in Example 1 with 10 g of a diisocyanate with 36 carbon atoms per molecule from technical grade dimerised oleic acid. After reacting for 4½ hours, a 25% aqueous dispersion (VI) of the product has a viscosity of 3400 cp.

EXAMPLE 6

100 g of a polyamide with an acid number of 6.1 and a base number of 35 (both expressed as mg KOH. g$^{-1}$) are melted at 150° in a current of nitrogen, and then 0.5 g of powdered sodium hydroxide are added. 290 g of propylene oxide are added dropwise with reflux cooling and with vigorous stirring to avoid excessive refluxing. After the reaction has gone to completion, the current of nitrogen is stopped and 880 g of ethylene oxide are introduced in the manner as described in Example 1. After about 20 hours 1270 g of a waxy, slightly brown product (VII) are afforded, titration of which gives 2145 g per hydroxyl group.

100 g of (VII) are melted with 1.84 g of a blocked diisocyanate (2,4-tolylene diisocyanate which is blocked with 1,1,1-trimethylolpropane and phenol in a molecular ratio of 3:1:3) at 60°, and the liquid is stirred for 30 minutes. The temperature is then increased to 125°, and the mixture is allowed to react for 30 minutes. A 25% aqueous solution (VIII) of the product thus obtained has a viscosity of 3,200 cp.

EXAMPLE 7

350 g of high molecular polyamide-6 for extrusion (viscosity number 240 according to DIN-53 727 measured from a 0.5 g/dl solution in 96% sulphuric acid) are dissolved at room temperature in 2362 g of 85% formic acid, and diluted with 2177 g of 45% formic acid. After 48 hours, 250 g of nylon are precipitated. The nylon is filtered and washed with about 20 l of cold water until there is no smell of formic acid.

172 g of the powdery, dried nylon-6 are suspended in 1230 g of decalin and then 2 g of sodium hydroxide are added. The process is continued as described in Example 1 and 1305 g of ethylene oxide are added at 150°, after which the decalin is completely removed by vacuum distillation. 1490 g of a bright, waxy, ethoxylated nylon-6 (IX) are thus obtained. Titration of (IX) gives an equivalent weight of 1145 g per hydroxyl group.

100 g of the product (IX) which has been slightly acidified with sulphuric acid (pH value of the 5% aqueous solution 7.8) are melted at 55°. 7.2 g of 4,4'- diphenylmethane diisocyanate are added dropwise to the melt over the course of 30 minutes, and the mixture is reacted for 30 minutes with constant stirring. The mixture is then heated to 115° and stirred for a further 1½ hours. A 25% aqueous solution (X) of the product thus obtained has a viscosity of 6,500 cp.

EXAMPLE 8

60.5 g of tris(hydroxymethyl)aminomethane and 15 g of water heated to 95° under a current of nitrogen in a three-necked flask. As soon as a clear solution has formed, 11 g of ethylene oxide are introduced, resulting in an addition reaction. The mixture is then heated to 140° in vacuo so that the water is completely distilled off. 1 g of powdered sodium hydroxide is then added, the mixture is stirred, the reaction vessel is rinsed with nitrogen and a further 319 g of ethylene oxide are introduced after which the temperature is maintained at 140°–150°. After about 12 hours, the reaction has gone to completion. The reaction vessel is rinsed again with nitrogen and then cooled. 393.5 g of a slightly yellow liquid (XI) are produced, which upon analysis shows an equivalent weight of 200 g per hydroxyl group.

50 g of (XI) are neutralised with sulphuric acid, so that a 5% aqueous solution has a pH value of 7.00, and then mixed with 11.67 of hexamethylene diisocyanate at room temperature, and stirred. The reaction mixture is heated to 100°, and after 50 minutes at this temperature, the viscosity begins to increase. The condensation product (XII) is then cooled. (XII) is a highly viscous liquid which is soluble in water, and which features less than 1% of free isocyanate groups.

EXAMPLE 9

50 g of (XI) (its 5% aqueous solution having a pH of 6.2) are neutralised in a similar manner to that described in Example 8, and the solution is then mixed with 7.25 g of toluylene diisocyanate (80% 2,4- and 20% 2,6-isomer) at 30°. The mixture is then heated to 110° and after 2 hours a highly viscous liquid (XIII) is produced, which readily dissolves in warm water.

EXAMPLE 10

50 g of (XI) (pH of a 5% solution 7.6) are reacted in a similar manner to that described in Example 8 with 11.6 g of polymethylene polyphenylene isocyanate (isocyanate equivalent weight 139 g, functionality about 3.2) at 90° for 6 hours. 61 g of a brown condensation product (XIV) are produced, the product solidifying at 32° and being readily soluble in water.

EXAMPLE 11

0.5 g of powdered sodium hydroxide are added to 100 g of anhydrous glycerine, and the mixture is heated to 140°–150° under a nitrogen atmosphere. As soon as this temperature has been reached, the nitrogen current is stopped and 334 g of ethylene oxide are gradually added at a speed at which it completely reacts. After about 11 hours, the reaction is complete, and the reaction vessel is rinsed again with nitrogen. 434 g of a slightly cream-colored liquid (XV) are produced, the analysis of which gives 139 g per hydroxyl group. 50 g of (XV) are neutralised with sulphuric acid (pH of a 5% solution 7.0), and then 16.67 g of polymethylene polyphenylisocyanate (see Example 4) are added at room temperature and the mixture is stirred. The mixture is concentrated at 90°. After 15 minutes, a waxy, slightly brown product (XVI) is produced, which has less than 1% free isocyanate groups.

EXAMPLE 12

100 g of (XV) are reacted with a further 253 g of ethylene oxide by the method described in Example 11. 353 g of a slightly brown liquid (XVII) are obtained, the analysis of which gives 451 g per hydroxyl group. 50 g of the compound (XVII) are reacted for 10 hours at 110° with 3.22 g of tolylene diisocyanate by the method described in Example 4. A liquid condensation product (XVIII) is obtained which contains less than 0.5% free isocyanate groups.

EXAMPLE 13

0.5 g of powdered sodium hydroxide are added to 63 g of tetraethylene pentamine under a nitrogen atmosphere, and heated to 125°. As soon as this temperature has been reached, the nitrogen current is stopped and 135.3 g of propylene oxide are added dropwise. After about 20 hours, the propylene oxide has completely reacted, and after heating to 140°–150°, 366.7 g of ethylene oxide are introduced under the same conditions as in Example 11. The reaction is complete after 12 hours, and 565 g of a brown, viscous liquid (XIX) are afforded with a hydroxyl equivalent of 1137 g.

100 g of the compound (XIX) are reacted for 10 hours at 115° with 2 g of diphenylmethane-4,4'-diisocyanate, under the same conditions as in Example 5. The resultant, thick, liquid condensation product (XX) has less than 0.01% free isocyanate groups.

EXAMPLE 14

149 g of anhydrous triethanolamine are reacted with 1540 g of ethylene oxide as in Example 11. 1689 g of a slightly brown liquid (XXI) are thus obtained, the analysis of which gives 551 g per hydroxyl group. 100 g of the compound (XXI) are reacted for 4 hours at 115° with 10.3 g of tolylene diisocyanate (mixture of 80% 2,4- and 20% 2,6-isomer) by the method described in Example 5. The resultant, thick, liquid condensation product (XXII) has less than 0.02% free isocyanate groups.

EXAMPLE 15

384 g of a N-mixed alkyl-propylene diamine, whose alkyl groups consist of a mixture of 1.3% myristyl, 4.7% palmityl, 42% stearyl, 12% arachidyl and 40% behenyl radicals and with an average molecular weight of 384, are reacted with 2200 g of ethylene oxide by the method described in Example 11. 2584 g of a waxy, yellow product (XXIII) are produced, the analysis of which gives 858.2 g per hydroxyl group. 100 g of the product (XXIII) are reacted for 5 hours at 110° with 6.7 g of tolylene diisocyanate (80% 2,4- and 20% 2,6-isomer) by the method described in Example 5. The resultant waxy condensation product (XXIV) solidifies at 45° and is readily soluble in water.

The ratio of the number of hydroxy groups of the oxalkylated compounds to the number of isocyanate groups in the polyisocyanates in the previous Examples is as follows:

Example 1=2.95
Example 2=4.24
Example 3=2.98
Example 4=9.68
Example 5=7.31
Example 6=3.0

Example 7 = 1.51
Example 8 = 1.8
Example 9 = 3.0
Example 10 = 3.0
Example 11 = 3.0
Example 12 = 3.0
Example 13 = 7.0
Example 14 = 1.5
Example 15 = 1.5

In a similar manner to that described in Examples 8 to 15, the following condensation products may be obtained, which are characterised by the starting materials and the ratio of hydroxy groups:isocyanate groups. The hydroxyalkyl compounds are oxyethylation products and are characterised by the polyfunctional starting material and the number of ethylene oxide units per molecule.

| Example No. | Polyfunctional compound | Number of ethylene oxide units per molecule of polyfunctional compound | polyisocyanate | OH : NCO ratio |
| --- | --- | --- | --- | --- |
| 16 | triethanolamine | 7 | tolylene diisocyanate | 3.0 |
| 17 | " | 7 | as Example 6 | 2.0 |
| 18 | " | 15 | tolylene diisocyanate | 2.0 |
| 19 | " | 25 | tolylene diisocyanate | 2.0 |
| 20 | " | 35 | tolylene diisocyanate | 1.5 |
| 21 | " | 75 | tolylene diisocyanate | 1.5 |
| 22 | glycerine | 30 | tolylene diisocyanate | 1.5 |
| 23 | trishydroxymethyl-aminomethane | 15 | hexamethylene diisocyanate | 2.0 |
| 24 | diethylenetriamine | 25 | tolylene diisocyanate | 2.5 |
| 25 | polyamide 11 | 6 (per amide group) | hexamethylene diisocyanate | 2.76 |

APPLICATION EXAMPLE A 20 kg of an unfixed polyester circular net fabric (Simtex 167.30/1) is prewashed for 20 minutes in an aqueous bath at 70° C. containing:
 1 g/l sodium lauryl sulphonate
 1 g/l calcinated soda, and
 0.25 g/l product XXII (Example 14)
at a goods:liquor ratio of 1:20 in a jet dyeing machine (Then-Flow, registered Trade Mark).

The material is then well rinsed and submitted to a dyeing treatment in the same jet dyeing machine, this time containing a fresh aqueous bath containing:
 1 g/l of an anionic dispersing agent (sodium salt of naphthalene-sulphonic acid/CH$_2$O)
 1% by weight ammonium sulphate
 0.4% by weight C.I. Disperse Red 11, and
 0.25 g/l product XXII (Example 14),
whose pH is adjusted to 5 by addition of formic acid, at a goods:liquor ratio of 1:20. The temperature of the bath, initially 40° C., is raised to 130° C. within 35–40 minutes. Dyeing is continued at 130° for 1 hour, after which the bath is cooled to 70° C. and cold rinsed. The dyed polyester material is then removed from the dyeing machine, dried by infra-red irradiation and fixed at 165° C.

It is observed that the dyed polyester material shows practically no signs of creasing.

If the process is repeated without the product XXII in the prewashing and dyeing stages, the material clearly shows visible crease marking.

APPLICATION EXAMPLE B

A nylon spun fabric material of size 2×0.3 m$^2$ is immersed in 10 l of an aqueous dyebath at 40° C. containing
 2% by weight acetic acid
 4% by weight of an anionic levelling agent, and
 0.25 g/l product XXII (Example 14)
in a winch-beck machine of 50 l capacity and treated therein for 10 minutes. 1.9% by weight of C.I. Acid Blue 40 is then added, and the bath is heated to boiling point. Dyeing is continued for 1 hour at boiling point, and the bath is then warm and cold rinsed. The material is removed from the bath and allowed to dry in air.

It is observed that the dyed material shows practically no signs of creasing or uneven edges.

If the process is repeated without the product XXII, the material clearly shows visible creasing and edge marking.

After the material treated with the product XXII has been dried in a Stenter frame, it is seen to be free of creases, whereas when the untreated material is submitted to the same drying process, crease marks are clearly visible.

APPLICATION EXAMPLE C

The procedure described in Application Example B is repeated, using a bath of the following composition:
 1 g/l of an anionic dispersing agent
 2 g/l ammonium sulphate, and
 0.25 g/l product XXII (Example 14)
whose pH is adjusted to 5.5 by addition of formic acid, and to which no dyestuff is added. A practically crease-free fabric results. If this process is repeated without product XXII, the fabric, in contrast, shows clearly visible creases.

What is claimed is:

1. A wet treatment process for synthetic or semi-synthetic textile material comprising employing a aqueous wet treatment liquor containing a polyurethane, which polyurethane is a reaction product of a compound or mixture of compounds 1, the or each compound 1 being a derivative of ammonia; a polyamine; urea; a polyamide; an aminoamide; an aminoalcohol; or a polyol containing up to 10 carbon atoms and up to 6 hydroxyl groups per molecule; in which at least three of the active hydrogen atoms of the amino, hydroxyl and/or amido moieties present are replaced by the same or different groups of formula 1a, $$-(\text{Alkylene-O})_{\overline{n}}H \qquad \text{1a}$$

in which
  each Alkylene, independently, is straight or branched chain $(C_{2-4})$-alkylene, unsubstituted or substituted by a phenyl group, and
  n is an integer 1 to 100,
and a compound or mixture of compounds 2, the or each compound 2 being a hydrocarbon polyisocyanate, in a molar ratio of compound(s) 1: compound(s) 2 of $\Sigma p:\Sigma r$, p being the moles of the or each compound 1 and r being the moles of the or each compound 2 reacted, $\Sigma p$ and $\Sigma r$ being so chosen that $\Sigma(p.q) \div \Sigma(r.m) = 1.5$ to 21 and $\Sigma p \leq \Sigma(r.m)$, q being the number of groups of formula 1a per molecule of the or each compound 1 and m being the number of isocyanate groups per molecule of the or each compound 2, and which polyurethane is water-soluble or -dispersible to a degree at least 1 g/l at 20° C., and whose 1 g/l aqueous solution or dispersion at 20° C. exhibits a viscosity of no more than 100 cp.

2. A wet treatment process according to claim 1, in which the molar ratio of compound(s) 1: compound(s) 2, $\Sigma p:\Sigma r$, is so chosen that the ratio of free hydroxyl groups to urethane groups in the polyurethane reaction product is from 0.5:1 to 10:1.

3. A wet treatment process according to claim 1, in which the polyurethane reaction product contains less than 1% of the unreacted isocyanate groups originally present in the starting compound(s) 2.

4. A wet treatment process according to claim 1, in which the or each compound 1 is selected from the polyoxyalkylated compounds of formulae, $$\left[ \text{N}\!-\!(\text{CH}_2)_{\overline{s}}\text{N} \right] \begin{array}{l} -(\text{H})_{4-q'} \\ -[(\text{Alkylene-O})_{\overline{n}}H]_{q'} \end{array} \qquad 11$$

$$\left\{ \text{N}\!-\!(\text{CH}_2)_{\overline{t}}\text{N} \right\}_{\overline{x}} \begin{array}{l} -(\text{H})_{(3+x)-q'} \\ -[(\text{Alkylene-O})_{\overline{n}}H]_{q'} \end{array} \qquad 12$$

$$R_3\!-\!N\!-\!\text{Alkylene}_1\!-\!N \begin{array}{l} (\text{Alkylene-O})_{\overline{n}}H \\ (\text{Alkylene-O})_{\overline{n}}H \end{array} \qquad 13$$
$$\quad | \\ (\text{Alkylene-O-})_nH$$

and $$\left[ \begin{array}{c} \text{N} \diagup \text{N} \diagdown \text{N} \\ \text{N} \diagdown \text{N} \diagup \\ \text{N} \\ \diagup \diagdown \end{array} \right] \begin{array}{l} -(\text{H})_{6-q'} \\ -[(\text{Alkylene-O})_{\overline{n}}H]_{q'} \end{array} \qquad 14$$

in which
  s is an integer 2 to 6,
  each t, independently, is an integer 2 or 3,
  x is an integer 2, 3, or 4,
  $R_3$ is $(C_{1-30})$alkyl or $(C_{3-20})$alkenyl,
  Alkylene$_1$ is $-(CH_2)_{\overline{2}}$, $-(CH_2)_{\overline{3}}$ or $-(CH_2)_{\overline{4}}$,
  q' is an integer at least 3, its maximum values being 4, (3+x) and 6 for the compounds of formula 11, 12 and 14, respectively,
  each Alkylene, independently, is straight or branched chain $(C_{2-4})$alkylene, unsubstituted or substituted by a phenyl group, and
  n is an integer 1 to 100,
the number of alkyleneoxy units present in the or each compound of formula 11, 12 or 14 being at least as great as the number of active hydrogen atoms in the amino moieties of the corresponding pre-oxyalkylation precursors thereof.

5. A wet treatment process according to claim 4, in which the or each compound 1 is selected from the polyoxyalkylated aliphatic polyamines of formulae 11, 12 and 13.

6. A wet treatment process according to claim 1, in which the or each compound 1 is selected from polyoxyalkylated polyamides of formula 15, $$H\!-\!(O\!-\!\text{Alkylene}_2)_{\overline{n'}}\!-\!\left[ \begin{array}{c} -\!A\!- \\ | \\ (\text{Alkylene}_2\!-\!O\!-)_wH \end{array} \right]_z\!-\!(\text{Alkylene}_2\!-\!O)_{\overline{n'}}\!-\!H \qquad 15$$

in which
  A is a repeating unit of an aliphatic, aromatic or araliphatic polyamide, the bond to $-(\text{Alkylene}_2\!-\!O)_wH$ being from the nitrogen atom of a $-\text{CON}-$ or $-\text{CONH}$ moiety contained in the repeating unit,
  each Alkylene$_2$, independently, is a divalent group of formula, $$-\text{CH}_2\!-\!\text{CH}- \\ \quad\quad | \\ \quad\quad X$$

wherein
  $x_1$ is hydrogen, methyl, ethyl or phenyl,
  each n', independently, is an integer 3 to 30,
  each w, independently, is 0 or an integer 3 to 30, and
  z is an integer 5 to 1000,
each repeating unit A being the same or different, at least three of the active hydrogen atoms of the amido moieties of the pre-oxyalkylation precursor thereof being replaced by the same or different groups $-(\text{Alkylene}_2\text{-O})_{\overline{n'}}H$, and in which the number of $-(\text{Alkylene}_2\text{-O})-$ units present is at least as great as the number of active hydrogen atoms in the amido moieties of the pre-oxyalkylation precursor.

7. A wet treatment process according to claim 1, in which the or each compound 1 is selected from polyoxyalkylated amidation products of an aliphatic monocarboxylic acid or a functional derivative thereof and one or more polyamines of formula 11a and 12a, $$H_2N\!-\!(CH_2)_{\overline{s}}NH_2 \qquad 11a$$

$$H_2N\!-\![(CH_2)_{\overline{t}}NH]_{\overline{x}}H \qquad 12a$$

in which s is an integer 2 to 6, each t, independently, is an integer 2 or 3, and x is an integer 2, 3 or 4.

8. A wet treatment process according to claim 1, in which the or each compound 1 is selected from polyoxyalkylated derivatives of alkanolamines containing a single amino group and 1 to 3 hydroxyl groups per molecule.

9. A wet treatment process according to claim 1, in which the or each compound 1 is selected from polyoxyalkylated derivatives of aliphatic polyols containing 3 to 10 carbon atoms and 3 to 6 hydroxyl groups per molecule.

10. A wet treatment process according to claim 1, in which the or each compound 1 is selected from compounds of formula 1', $$\left[ A_1 \begin{array}{c} -(H)_{q'''-q''''} \\ -[-(\text{Alkylene}_2-O-)_{n''}-H]_{q''''} \end{array} \right] \quad 1'$$

in which
$A_1$ is
nitrogen,
a radical 11b, $$>N-(-CH_2-)_s-N< \quad 11b$$

a radical 12b, $$>N-[-(-CH_2-)_t-N-]_x- \quad 12b$$

a radical 13b, $$R_3-N-\text{Alkylene}_1-N< \quad 13b$$

a radical of an aliphatic, aromatic or araliphatic polyamide containing 5 to 1000 repeating units, said radical being derived from the polyamide by removal of the hydrogen atoms from the —CONH$_2$ and —CONH— groups, a radical 16b, $$R_4CO-N-(-CH_2-)_s-N< \quad 16b$$

a radical 17b, $$R_4CO-N-[-(-CH_2-)_t-N-]_x- \quad 17b$$

a radical of an alkanolamine containing a single amino group, 1 to 3 hydroxyl groups and 4 to 6 carbon atoms per molecule, said radical being derived from the alkanolamine by removal of the hydrogen atoms from the amino and from the hydroxyl groups(s), or a radical of an aliphatic polyol containing 3 to 10 carbon atoms and 3 to 6 hydroxyl groups per molecule, said radical being derived from the polyol by removal of the hydrogen atoms from the hydroxyl groups, s is an integer 2 to 6, each t, independently, is an integer 2 or 3, x is an integer 2, 3 or 4, $R_3$ is ($C_{1-30}$) or ($C_{3-20}$) alkenyl, Alkylene$_1$ is $-(CH_2)_2-$, $-(CH_2)_3-$ or $-(CH_2)_4-$, $R_4$ is ($C_{1-23}$) alkyl or ($C_{2-19}$) alkenyl, each Alkylene$_2$, independently, is a divalent group of formula $$-CH_2-CH- \\ \phantom{-CH_2-C}| \\ \phantom{-CH_2-CC}X$$

wherein X is hydrogen, methyl, ethyl or phenyl, each n'', independently, is, when $A_1$ is nitrogen, an integer 3 to 100, or, when $A_1$ is any other of the indicated radicals, an integer 3 to 30, q''' is the maximum valency for each radical signified by $A_1$, being 3 when $A_1$ is nitrogen, 4 when $A_1$ is a radical 11b, (3+x) when $A_1$ is a radical 12b, 3 when $A_1$ is a radical 13b, 7 to 1002 when $A_1$ is a radical of a polyamide containing 5 to 1000 repeating units, respectively, 3, 4 or 5 when $A_1$ is a radical of an alkanolamine containing 1, 2 or 3 hydroxyl groups per molecule, respectively, or 3, 4, 5 or 6 when $A_1$ is a radical of an aliphatic polyol containing 3, 4, 5 or 6 hydroxyl groups, respectively, and q'''' is an integer 3 to q''', with the provisos that, when $A_1$ is a polyamide radical, the polymeric chain of the polyoxyalkylated polyamide is terminated at both ends by a group $-[(\text{Alkylene}_2)-O_{n''}H]_{q''''}$, each repeating unit is the same or different, and the number of $-(\text{Alkylene}_2-O-)$ units present is at least as great as the number of active hydrogen atoms in the amido moieties of the preoxyalkylation precursor.

11. A wet treatment process according to claim 1, in which the or each compound 2 has 2 to 12 isocyanato substituents per molecule.

12. A wet treatment process according to claim 1, 3, 4, 6, 7, 8, 9 or 10, in which the or each compound 2 is selected from those of formulae, $$OCN-R_1-NCO \quad 21$$

$$R_2-CH_2-NCO \quad 22$$

[structure 23: bis(isocyanato-R'-R''-phenyl)methane repeating unit with H terminus, subscript y]

and

[structure 24: OCN-(R''' cyclohexyl)-CH$_2$-(R''' cyclohexyl)-NCO]

in which $R_1$ is straight or branched chain ($C_{2-40}$) alkylene; cyclohexylene, saturated or unsaturated with one or two double bonds and unsubstituted or substituted with 1 to 3 ($C_{1-2}$) alkyl groups; or phenylene, diphenylene or naphthylene, each unsubstituted or substituted with 1 or 2 ($C_{1-9}$) alkyl groups, the —NCO groups on diphenylene being on different benzene nuclei, $R_2$ is a radical of formula,

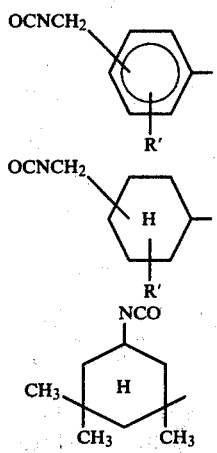

each R', independently, is hydrogen or ($C_{1-9}$) alkyl, each R'', independently, is hydrogen or —NCO, each R''', independently, is hydrogen or methyl, and y is an integer 1 to 5, there being no more than 6 —NCO groups per molecule in the compounds of formula 23, and any two —NCO groups on the same benzene ring being m- or p- to each other, in the compounds of formula 23.

13. A wet treatment process according to claim 1, in which the process is effected simultaneously with a dyeing, optical brightening, bleaching, washing, boiling or fixation process.

14. A process according to claim 1 wherein the polyurethane is washed out of the textile material after the wet treatment.

15. A process according to claim 1 wherein the polyurethane has a water solubility of at least 25 g/l at 20° C.

16. A process according to claim 12 wherein the textile material is cellulose 2½ acetate, cellulose triacetate, polyamide, polyester or polyacrylonitrile and the polyurethane is present in the treatment liquor at a concentration between 0.1 and 5 grams per liter.

17. A process according to claim 16 wherein the treatment liquor is employed at a temperature between 50° and 150° C.

18. A polyurethane reaction product of the reaction between a compound or a mixture of compounds of formula 1',

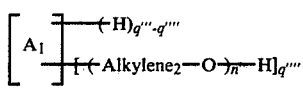

in which
$A_1$ is
nitrogen,
a radical 11b,

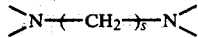

a radical 12b,

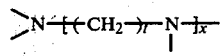

a radical 13b,

a radical of an aliphatic, aromatic or araliphatic polyamide containing 5 to 1000 repeating units, said radical being derived from the polyamide by removal of the hydrogen atoms from the —$CONH_2$ and —CONH groups, a radical 16b,

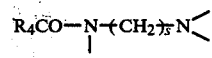

a radical 17b,

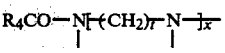

a radical of an alkanolamine containing a single amino group, 1 to 3 hydroxyl groups and 4 to 6 carbon atoms per molecule, said radical being derived from the alkanolamine by removal of the hydrogen atoms from the amino and from the hydroxyl group(s), or a radical of an aliphatic polyol containing 3 to 10 carbon atoms and 3 to 6 hydroxyl groups per molecule, said radical being derived from the polyol by removal of the hydrogen atoms from the hydroxyl groups, s is an integer 2 to 6,
each t, independently, is an integer 2 or 3,
x is an integer 2, 3 or 4,
$R_3$ is ($C_{1-30}$) alkyl or ($C_{3-20}$) alkenyl,
Alkylene$_1$ is $-(CH_2)_2-$, $-(CH_2)_3-$ or $-(CH_2)_4-$,
$R_4$ is ($C_{1-23}$) alkyl or ($C_{2-19}$) alkenyl,
each Alkylene$_2$, independently, is a divalent group of formula

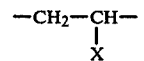

wherein X is hydrogen, methyl, ethyl or phenyl, at least 35% of the Alkylene$_2$ moieties being ethylene, each n'', independently, is, when $A_1$ is nitrogen, an integer 3 to 100, or, when $A_1$ is any other of the indicated radicals, an integer 3 to 30, q''' is the maximum valency for each radical signified by $A_1$, being 3 when $A_1$ is nitrogen, 4 when $A_1$ is a radical 11b, (3+x) when $A_1$ is a radical 12b, 3 when $A_1$ is a radical 13b, 7 to 1002 when $A_1$ is a radical of a polyamide containing 5 to 1000 repeating units, respectively, 3, 4 or 5 when $A_1$ is a radical of an alkanolamine containing 1, 2 or 3 hydroxyl groups per molecule, respectively, or 3, 4, 5 or 6 when $A_1$ is a radical of an aliphatic polyol containing 3, 4, 5 or 6 hydroxyl groups, respectively, and $q''''$ is an integer 3 to $q'''$, with the provisos that, when $A_1$ is a polyamide radical, the polymeric chain of the polyoxyalkylated polyamide is terminated at both ends by a group $+[Alkylene_2-O_{n'''}H]_{q''''}$, each repeating unit is the same or different, and the number of $+Alkylene_2-O+$ units present is at least as great as the number of active hydrogen atoms in the amido moieties of the pre-oxyalkylation precursor and a compound or mixture of compound 2, the or each compound 2 being a hydrocarbon polyisocyanate, in a molar ratio of compound(s) of formula 1': compound(s) 2 of $\Sigma p': \Sigma r'$, $p'$ being the moles of the or each compound of formula 1' and $r'$ being the moles of the or each compound 2 reacted, and $\Sigma p'$ and $\Sigma r'$ being so chosen that $\Sigma(p' \cdot q'''') \div \Sigma(r' \cdot m) = 1.5$ to 21 and $\Sigma p' \leq \Sigma(r' \cdot m)$, $q''''$ being the number of groups of formula 1'a, $+[Alkylene_2-O_{n'''}H]$        1'a per molecule of the or each compound of formula 1' and m being the number of isocyanate groups per molecule of the or each compound 2, and which polyurethane product is water-soluble or —dispersible to a degree of at least 1 g/l at 20° C., and whose 1 g/l aqueous solution or dispersion at 20° C. exhibits a viscosity of no more than 100 cp.

19. A polyurethane according to claim 18 wherein compound 2 is selected from those of formulae

OCN—$R_1$—NCO      21

$R_2$—$CH_2$—NCO      22

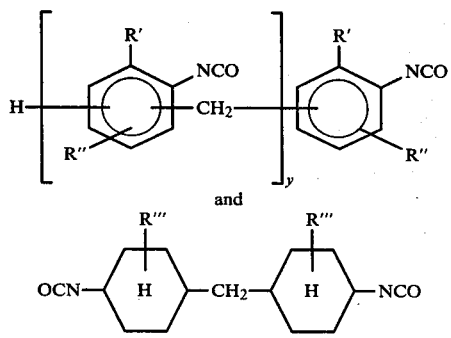

23 and

24 in which $R_1$ is straight or branched chain ($C_{2-40}$) alkylene; cyclohexylene, saturated or unsaturated with one or two double bonds and unsubstituted or substituted with 1 to 3 ($C_{1-2}$) alkyl groups; or phenylene, diphenylene or naphthylene, each unsubstituted or substituted with 1 or 2 ($C_{1-9}$) alkyl groups, the —NCO groups on diphenylene being on different benzene nuclei, $R_2$ is a radical of formula,

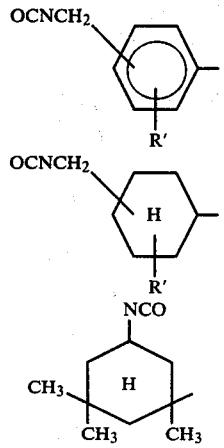

each R', independently, is hydrogen or ($C_{1-9}$) alkyl,
each R'', independently, is hydrogen or —NCO,
each R''', independently, is hydrogen or methyl, and
y is an integer 1 to 5, there being no more than 6 —NCO groups per molecule in the compounds of formula 23, and any two —NCO groups on the same benzene ring being m- or p- to each other, in the compounds of formula 23.

20. A polyurethane according to claim 19 which is a reaction product of a compound of formula 1' in which $A_1$ is nitrogen or a radical of a polyamide, alkanolamine or aliphatic polyol, Alkylene$_2$ is ethylene-1, 2 or propylene-1, 2 and n'' is 3 to 20 when $A_1$ contains 2 or more nitrogen atoms and a compound 2 selected from the group consisting of 1,2-dimethylenediisocyanate, 1,6-hexamethylenediisocyanate and further α,ω-polyalkylenediisocyantes containing up to 34 carbon atoms in the polyalkylene chain, isophoron diisocyanate, xylidene diisocyanate, 1,3-bis(isocyanatomethyl)cyclohexane, cyclohexylene diisocyanate, 2,4- and 2,6-tolylene diisocyanate, m-phenylene diisocyanate, xylene diisocyanate, 1,5-naphthylene diisocyanate, 4,4'-diphenylmethane diisocyanate, 3,3'-dimethyl-4,4'-diphenylene diisocyanate, 3,3'-dimethyl-4,4'-diisocyanatodiphenylmethane and polymethylene polyphenylene isocyanates.

21. A polyurethane reaction product according to claim 18 wherein the or each compound of formula 1' is one in which $A_1$ is nitrogen.

22. An aqueous concentrate of a polyurethane reaction product as defined in claim 18, at a concentration of at least 25% by weight.

* * * * *

UNITED STATES PATENT AND TRADEMARK OFFICE
CERTIFICATE OF CORRECTION

PATENT NO. : 4,186,119
DATED : January 29, 1980
INVENTOR(S) : Jose Canela/Hans Gerber It is certified that error appears in the above—identified patent and that said Letters Patent is hereby corrected as shown below:

First page, please insert Item [30].

-- Foreign Application Priority Data

Nov. 17, 1976    Switzerland    14465/76    --.

Column 18, line 46, claim 6; change "$X_1$" to --X--.

Column 19, line 66, claim 10; change "groups(s)" to --group(s)--.

Signed and Sealed this

*Twentieth* Day of *October 1981*

[SEAL]

*Attest:*

*Attesting Officer*

GERALD J. MOSSINGHOFF

*Commissioner of Patents and Trademarks*